United States Patent
Jossens et al.

(10) Patent No.: US 6,228,254 B1
(45) Date of Patent: May 8, 2001

(54) MILD HYDROTREATING/EXTRACTION PROCESS FOR LOW SULFUR GASOLINE

(75) Inventors: Lawrence W. Jossens, Albany; Curtis L. Munson, Oakland, both of CA (US)

(73) Assignee: Chevron U.S.A., Inc., San Francisco, CA (US)

( * ) Notice: Subject to any disclaimer, the term of this patent is extended or adjusted under 35 U.S.C. 154(b) by 0 days.

(21) Appl. No.: 09/330,762

(22) Filed: Jun. 11, 1999

(51) Int. Cl.$^7$ .................................................. C10G 45/02
(52) U.S. Cl. ..................... 208/212; 208/209; 208/213; 208/217; 208/216 R
(58) Field of Search ...................... 208/209, 212, 208/213, 217, 216 R

(56) References Cited

U.S. PATENT DOCUMENTS

| | | | | |
|---|---|---|---|---|
| 3,331,770 | * | 7/1967 | Cockerham | 208/212 |
| 4,287,050 | | 9/1981 | Eastman et al. | 208/215 |
| 4,290,913 | | 9/1981 | Frame | 252/428 |
| 4,314,901 | | 2/1982 | Nowack et al. | 208/216 R |
| 4,486,297 | * | 12/1984 | Matsumoto et al. | 208/211 |
| 5,059,304 | * | 10/1991 | Field | 208/99 |
| 5,259,946 | * | 11/1993 | Robinson et al. | 208/65 |
| 5,271,835 | | 12/1993 | Gorawara et al. | 208/228 |
| 5,290,427 | | 3/1994 | Fletcher et al. | 208/89 |
| 5,298,150 | * | 3/1994 | Fletcher et al. | 208/89 |
| 5,360,536 | | 11/1994 | Nemeth et al. | 208/248 |
| 5,401,365 | | 3/1995 | Chen et al. | 203/32 |
| 5,407,559 | * | 4/1995 | Degnan et al. | 208/89 |
| 5,411,658 | * | 5/1995 | Chawla et al. | 208/89 |
| 5,454,933 | * | 10/1995 | Savage et al. | 208/212 |
| 5,510,016 | * | 4/1996 | Hilbert et al. | 208/89 |
| 5,518,607 | * | 5/1996 | Field et al. | 208/12 |
| 5,582,714 | | 12/1996 | Forte | 208/237 |
| 5,597,476 | | 1/1997 | Hearn et al. | 208/208 R |
| 5,807,475 | | 9/1998 | Kulprathipanja et al. | 208/208 R |
| 5,843,300 | | 12/1998 | Zinnen et al. | 208/250 |
| 5,846,406 | | 12/1998 | Sudhakar et al. | 208/216 R |
| 5,925,239 | * | 7/1999 | Klein et al. | 208/213 |
| 5,928,497 | * | 7/1999 | Iaccino | 208/212 |

OTHER PUBLICATIONS

Del Rossi et al., "Hydrofinishing Olefinic Gasoline", Prepared for Presentation at: AIChE Spring National Meeting, Hydroprocessing I Symposium, Fuels and Petrochemicals Division, Mar. 21, 1995, Houston, Texas.

Hatanaka et al., "Selective CCG HDS on Co–Mo/γ–Al$_2$O$_3$ Catalyst Modified by Coking Treatment" No Date.

Desai et al., "FCC Gasoline Sulfur Reduction", Fuel Reformulation, V. 4 (6), pp. 43–44 (Nov./Dec. 1994).

* cited by examiner

*Primary Examiner*—Hien Tran
*Assistant Examiner*—Nadine Preisch
(74) *Attorney, Agent, or Firm*—A. W. Klaassen; W. K. Turner; J. W. Ambrosius

(57) ABSTRACT

A two step sulfur removal comprising a mild hydrotreating step followed by an extraction step reduces the sulfur content in gasoline to a very low level without significantly reducing the octane of the gasoline.

13 Claims, 5 Drawing Sheets

MILD HYDROTREATING/EXTRACTION PROCESS FOR LOW SULFUR GASOLINE

BACKGROUND OF THE INVENTION

The present invention is directed to a process for reducing the sulfur content in gasoline to a very low level. Gasoline is generally prepared from a number of blend streams. Typical examples include butanes, light straight run, isomerate, FCC cracked products, hydrocracked naphtha, coker gasoline, alkylate, reformate, added ethers, etc. Of these, gasoline blend stocks from the FCC, the reformer and the alkylation unit account for a major portion of the gasoline pool. FCC gasoline, and if present, coker naphtha and pyrolysis gasoline, generally contribute a substantial portion of the pool sulfur.

Sulfur present in the gasoline pool may be in one of several molecular forms, including thiophenes, mercaptans and disulfides. Typical thiophenes include thiophene ($<(CH:CH)_2>S$) and its alkylated derivatives, and benzothiophene (alternatively thianaphthene). Typical mercaptans occurring in the sulfur-containing gasoline streams include thiophenol ($C_6H_5SH$), and the alkylthiols from ethanethiol to nonanethiol, with potentially smaller amounts of the higher alkylthiols.

A number of methods have been proposed for removing sulfur from gasoline. In general, hydrotreating is the method of choice, on account of the cost and ease of processing using the catalytic method. However, sulfur removal by hydrotreating is generally accompanied by substantial octane loss, as the olefins in the gasoline are converted to low octane components while the sulfur compounds are being removed. A number of proposals have been made to offset the octane loss associated with gasoline hydrotreating.

According to U.S. Pat. No. 3,957,625, the sulfur impurities tend to concentrate in the heavy fraction of the gasoline and a method for removing the sulfur includes hydrodesulfurization of the heavy fraction of the catalytically cracked gasoline so as to retain the octane contribution from the olefins which are found mainly in the lighter fraction. U.S. Pat. No. 5,290,427 teaches fractionating a sulfur containing gasoline feed, and introducing each fraction in turn into a hydrodesulfurization reactor at spaced locations along the length of the reactor according to boiling point. By this method, low boiling, olefin containing fractions are treated for a relatively shorter time, and higher boiling fractions, with lesser amounts of olefins and higher amounts of sulfur containing molecules, are treated for a relatively longer time. U.S. Pat. No. 5,290,427 further teaches contacting the intermediate product from the hydrodesulfurization reaction zone with an acidic catalyst, reportedly to produce a product having a higher octane number than that of the intermediate product.

In U.S. Pat. No. 4,049,542, Gibson et al. discloses a process in which a copper catalyst is used to desulfurize an olefinic hydrocarbon feed such as catalytically cracked light naphtha. This catalyst is stated to promote desulfurization while retaining the olefins and their contribution to product octane.

While regulations require lower sulfur levels in gasoline, there continues to be a need for higher gasoline octane. These often conflicting objectives serve to highlight the need for new methods for reducing sulfur levels in a gasoline pool while maintaining pool octane.

SUMMARY OF THE INVENTION

The present invention is directed to a process for desulfurizing a gasoline stream while maintaining the octane of the blend stock. The process comprises:

(a) contacting a sulfur-containing gasoline stream with hydrogen in the presence of a hydrotreating catalyst at conditions and for a time sufficient to convert up to 95% of the thiophenes present in the stream, to produce a hydrotreated gasoline stream;

(b) contacting the hydrotreated gasoline stream with a solid adsorbent or a liquid extractant selected to remove some or all of the sulfur compounds remaining in the hydrotreated gasoline stream.

The present process is a multi-step process for removing sulfur from a sulfur-containing gasoline stream. A hydrotreating step at very mild conditions removes a portion of the sulfur compound and produces a hydrotreated product from which at least a portion of the remaining sulfur compound may be more easily removed by adsorption or extraction. The process of this invention removes the sulfur contained in the gasoline to very low levels, while maintaining the olefin content and the octane value of the gasoline. Preferred gasoline streams produced in the process contain less than about 150 ppm, more preferably less than about 100 ppm, and still more preferably less than about 50 ppm total sulfur.

DETAILED DESCRIPTION

Figure 1:
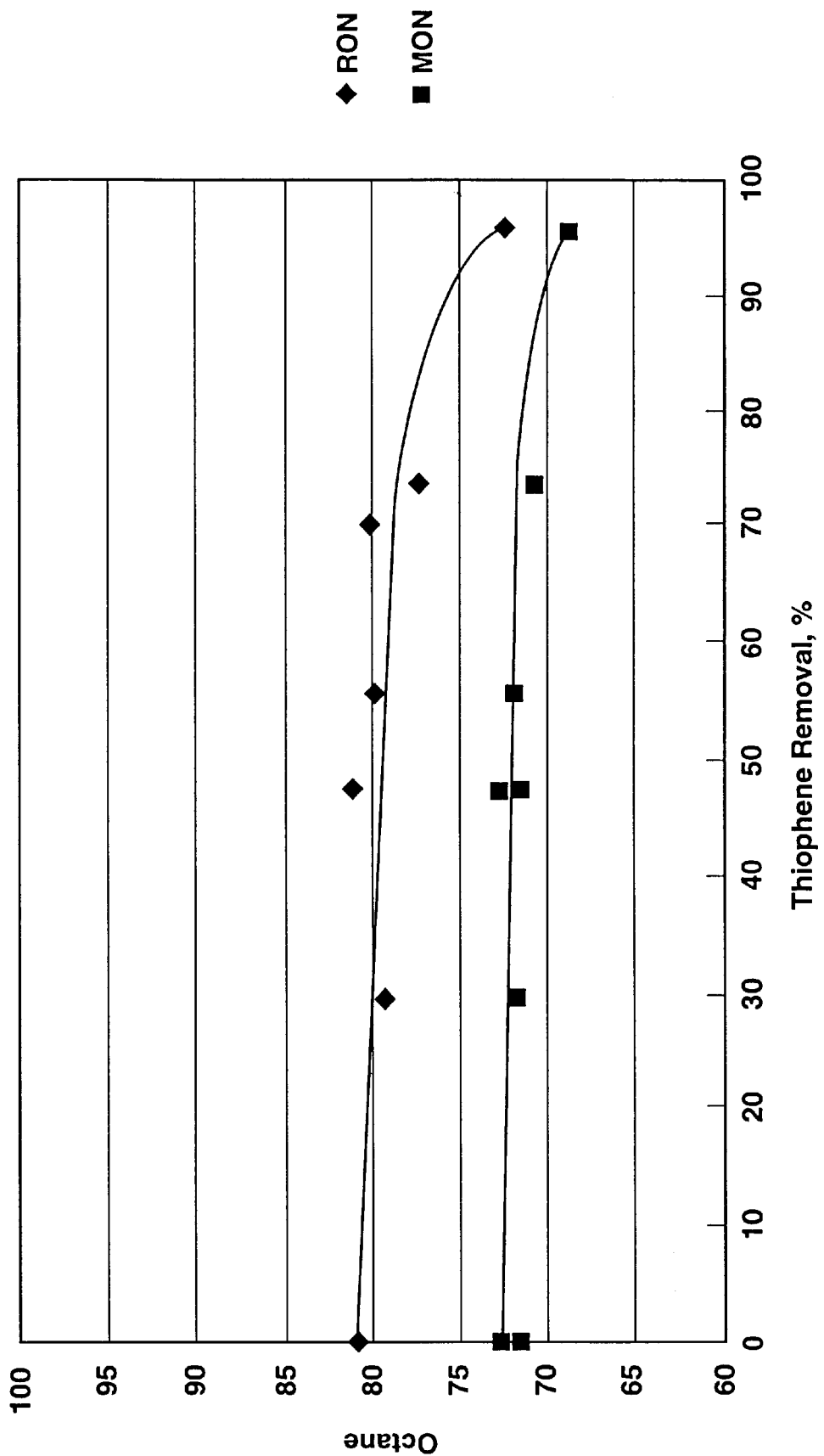
FIGS. 1–3 illustrate the effect of hydrotreating severity on the resulting octane of desulfurized gasolines.

Sulfur compounds present in gasoline occur principally as mercaptans, aromatic heterocyclic compounds and disulfides. Relative amounts of each depend on a number of factors, many of which are refinery, process and feed specific. In general, heavier fractions contain a larger amount of sulfur compounds, and a larger fraction of these sulfur compounds are in the form of aromatic heterocyclic compounds. In addition, certain streams commonly blended for gasoline, e.g. FCC feedstocks, contain high amounts of the heterocyclic compounds. Gasoline streams containing significant amounts of these heterocyclic compounds are difficult to process. Very severe operating conditions have been conventionally specified for hydrotreating processes to desulfurize gasoline streams, resulting in a large octane penalty. Adsorption processes, used as an alternative to hydrogen processing, have very low removal efficiencies, since the aromatic heterocyclic sulfur compounds have adsorptive properties similar to the aromatic compounds in the hydrocarbon matrix.

Rather than operating a hydrotreating step at high severities in order to reduce the sulfur content of a sulfur-containing gasoline, the hydrotreating step in the present process is operated at very mild conditions of temperature, pressure and feed rate. Among other factors, the present invention is based on the surprising discovery that, during the mild hydrotreating step, which converts up to 95% of the aromatic heterocyclic sulfur compounds, the amount of mercaptans present in the gasoline blend actually increases while the amount of the aromatic heterocyclic sulfur compounds is reduced. Rather than hydrotreating to remove the mercaptans remaining after a substantial portion of the heterocyclic sulfur compounds are converted, these remaining mercaptans in the process are then removed by contacting the gasoline stream with a solid adsorbent or a liquid extractant having an affinity for the mercaptan sulfur compounds. This contacting step to sorb the remaining sulfur compounds can be achieved at very high gasoline yields and with little or no reduction in octane.

The present two-step sulfur removal process is equally suited to streams containing high amounts of mercaptans, such as a coker pentane/hexane stream. Such mercaptan-containing streams may be suitably treated by contacting the stream with a solid adsorbent or a liquid extractant in an extraction process. However, the use of a very mild hydrotreating step, according to the present process, followed by an adsorption or extraction step, provides good sulfur removal with little product octane reduction, while requiring a considerably smaller processing unit for conducting the adsorption or extraction step. Thus, the use of the mild hydrotreating step provides economic benefit to the overall process.

The present process is effective for reducing the sulfur content of a gasoline stream or gasoline. As used herein, a gasoline stream includes individual refinery streams suitable for use as a blend stock for gasoline, or a blended gasoline stream containing two or more streams, each of which are suitable for use as a gasoline blend stock. A suitable gasoline blend stock, when blended with other refinery streams, produces a combined stream which meets the requirements for gasoline, which requirements are well documented in Federal and State regulations.

The feed to the process comprises a sulfur-containing petroleum fraction which boils in the gasoline boiling range, including FCC gasoline, coker pentane/hexane, coker naphtha, FCC naphtha, straight run gasoline, and mixtures containing two or more of these streams. Such gasoline blending streams typically have a normal boiling point within the range of 0° C. and 260° C., as determined by an ASTM D86 distillation. Feeds of this type include light naphthas typically having a boiling range of about $C_6$ to 165° C. (330° F.); full range naphthas, typically having a boiling range of about $C_5$ to 215° C. (420° F.), heavier naphtha fractions boiling in the range of about 125° C. to 210° C. (260° F.–412° F.), or heavy gasoline fractions boiling at, or at least within, the range of about 165° C. to 260° C. (330° F.–500° F.), preferably about 165° C. to 210° C. In general, a gasoline fuel will distill over the range of from about room temperature to 260° C. (500° F.).

Aromatic heterocyclic compounds include alkyl substituted thiophene, thiophenol, alkylthiophene and benzothiophene. Among the aromatic heterocyclic compounds of particular interest in this application are thiophene, 2-methylthiophene, 3-methylthiophene, 2-ethylthiophene, benzothiophene and dimethylbenzothiophene. These aromatic heterocyclic compounds are collectively termed "thiophenes". Mercaptans which will be removed by the process of this invention often contain from 2-10 carbon atoms, and are illustrated by materials such as 1-ethanthiol, 2-propanethiol, 2-butanethiol, 2-methyl-2-propanethiol, pentanethiol, hexanethiol, heptanethiol, octanethiol, nonanethiol and thiophenol.

Sulfur in gasoline originating from these gasoline streams may be in one of several molecular forms, including thiophenes, mercaptans and disulfides. For a given gasoline stream, the sulfur compounds tend to be concentrated in the higher boiling portions of the stream. Such a stream may be fractionated, and the heavier fraction treated using the present process. Alternatively, the entire stream may be treated. For example, light gasoline streams which are particularly rich in sulfur compounds, such as coker pentane/hexane, may be suitably treated as a blend stream which also contains a higher boiling, lower sulfur containing component. In general, gasoline streams suited for treating in the present process contain greater than about 10 ppm thiophenic compounds. Typically, streams containing more than 40 ppm thiophenic compounds, up to 2000 ppm thiophenic compounds and higher may be treated as described herein. After treatment according to the invention, the sulfur content is desirably less than about 150 ppm, preferably less than 100 ppm and most preferably less than 50 ppm.

The total sulfur content of the gasoline stream to be desulfurized in the present process will generally exceed 50 ppm by weight, and typically range from about 150 ppm to as much as several thousand ppm sulfur. For fractions containing at least 5 vol. % boiling over about 380° F. (193° C.), the sulfur content may exceed about 1000 ppm by weight and may be as high as 4000 to 5000 ppm by weight or even higher.

Standard analytical procedures are available for determining the total sulfur content of a gasoline stream. Gas chromatographic procedures are also readily available for analyzing specifically for thiophenic, mercaptan, and disulfide compounds in the stream.

Many gasoline blend streams also contain olefins. Blend streams originating from the FCC, for example, will be olefinic, with an olefin content of at least 5 or more percent, typically in the range of 10 to 30, e.g. 15–25, weight percent.

In the present process a sulfur-containing gasoline stream is contacted with hydrogen in the presence of a hydrotreating catalyst at hydrotreating conditions and for a time sufficient to convert up to 95%, and preferably between about 70% and about 90% of the thiophenes present in the gasoline. Hydrotreating conditions suitable in the present process are particularly mild conditions, and include a reaction temperature between 300° F. and 500° F., preferably between 350° F. and 475° F., e.g. 400° F.; a total reaction pressure between 50 psig and 500 psig, preferably between 100 psig and 400 psig, e.g. between 100 psig and 200 psig, with a hydrogen partial pressure between 70 psig and 140 psig; and a feed rate between 0.5 $hr^{-1}$ and 10 $hr^{-1}$, preferably between 1 $hr^{-1}$ and 4 $hr^{-1}$, e.g. 1.2 $hr^{-1}$.

The hydrogen feed to the hydrotreating process is desirably of high purity, particularly with respect to sulfur content (including $H_2S$ content). Hydrogen containing less than 1000 ppm $H_2S$ is preferred, with hydrogen containing less than 500 ppm $H_2S$ being more preferred and hydrogen containing less than 250 ppm $H_2S$ being still more preferred. Hydrogen purity with respect to $H_2S$ (and other sulfur species) content is most preferably as low as the economics of the process permits. Using an $H_2S$ scavenger in a hydrogen recycle loop helps maintain high hydrogen purity at low hydrogen costs.

The catalyst for use in the hydrotreating reaction zone is a conventional hydrotreating catalyst of the type used to carry out hydrodenitrification and hydrodesulfurization reactions, and having substantially no cracking activity. Those familiar with the art recognize that such catalysts generally are constituted by a metal from Group VI and a metal from Group VIII placed on a non-acidic oxide such as alumina. The commercial catalysts generally fall into one or more of the numerous nickel-molybdenum or cobalt-molybdenum, or nickel-tungsten or cobalt-tungsten families. The catalytic metals are supported by alumina or other low acidic support material. Such catalysts to be useful in the present invention do not have cracking activity, that is they are non-zeolitic non-acidic catalysts which function to promote hydrodentrification and hydrodesulfurization reactions. Such catalysts are well known in the art. The amount(s) of hydrogenation component(s) in the catalyst suitably range from about 0.5% to about 10% by weight of Group VIII metal component(s) and from about 5% to about 25% by weight of Group VI metal component(s), calculated as metal(s) per 100 parts by weight of total catalyst. The hydrogenation components in the catalyst may be in the oxidic and/or the sulphidic form. If a combination of at least a Group VI and a Group VIII metal component is present as (mixed) oxides, it will be subjected to a sulphiding treatment prior to proper use in hydrotreating. Suitably, the catalyst comprises one or more components of nickel and/or cobalt and one or more components of molybdenum and/or tungsten and/or one or more components of platinum and/or palladium.

In the process, the hydrotreated gasoline stream recovered from the hydrotreating step is contacted with a solid adsorbent or a liquid extractant to remove some or all of the sulfur compounds remaining in the hydrotreated gasoline stream. Both the solid adsorbent and the liquid extractant are characterized by an affinity for the sulfur compounds in the gasoline stream. The process for extracting the sulfur compounds into a liquid extractant involves a liquid phase which is substantially immiscible in the gasoline stream, and which preferentially absorbs or dissolves the sulfur compounds for removal from the gasoline stream. Either an aqueous or substantially organic liquid extractant may be used. For example, n-formylmorpholine may be used to extract thiophenes from the gasoline stream.

The Merox process is particularly suited for extracting light (e.g. $C_5$) mercaptans. A description of the Merox process may be found, for example, in D. L. Holbrook, "UOP Merox Process", Handbook of Petroleum Refining Processes, (Second Edition) ed. Robert A. Meyers, McGraw-Hill, 1997, p. 11.29. In such mercaptan-extraction units, fresh feed is charge to an extraction column, where mercaptans are extracted by a countercurrent caustic stream. The mercaptans are converted over a metal chelate catalyst in the presence of air to a disulphide. An oily disulphide layer is recovered from the caustic. The disulfide oil can be injected into the charge to a hydrotreating unit or sold as a specialty product. A similar process is disclosed in U.S. Pat. No. 4,290,913.

The sulfur compounds remaining in the gasoline stream may also be removed by passing the gasoline stream over a solid adsorbent. Example solid adsorbents comprise materials including alumina, a zeolitic material, a clay material, included acid activated clay, activated carbon, copper on activated carbon, cobalt disulfophthalocyanine on activated carbon, metal oxides such as ZnO and magnesium aluminum oxide and UOP's Mixed Oxide Solid Solution (MOSS) material. U.S. Pat. No. 5,807,475 discloses a process for removing sulfur containing compounds from a liquid hydrocarbon stream using an adsorbent selected from the group consisting of NiX zeolite, MoX zeolite, NiY zeolite, a smectite layered clay and mixtures thereof. U.S. Pat. No. 5,843,300 discloses a similar process using an impregnated potassium-exchanged Y zeolite for adsorbing organic compounds from a petroleum feedstock. U.S. Pat. No. 5,360,536 discloses a similar process using a clay adsorbent. These disclosures are incorporated herein by reference for all purposes. Reactants for converting mercaptans, such as DuPont's Oxone process, are also suitable.

The entire disclosure of U.S. Pat. No. 5,582,714, which is incorporated herein by reference for all purposes, teaches an extraction process for removing sulfur from gasoline. Both the adsorption and the extraction process may be operated over a wide range of temperatures and pressures. However, pressures and temperatures near ambient (i.e. less than about 50° C. and less than 2 atmospheres pressure) are preferred.

Preferably, no more than 150 ppm total sulfur remains in the gasoline stream following the sorption step using either the solid adsorbent or the liquid extractant to remove the remaining sulfur. More preferred gasoline product streams recovered from the process contain less than about 100 ppm total sulfur, and still more preferably less than about 50 ppm total sulfur and less than about 10 ppm mercaptan sulfur.

The following examples are presented as illustrating preferred embodiments of this invention and are not intended as undue limitations on the generally broad scope of the invention as set out in the appended claims.

EXAMPLES

Example 1

A coker pentane/hexane stream having the properties listed in Table I was hydrotreated over Criterion 448 catalyst, a commercial cobalt/molybdenum/$Al_2O_3$ catalyst, at a feed rate of 1.2 $hr^{-1}$, 4200 SCFB hydrogen rate at 100-400 psig $H_2$ pressure, and at temperatures ranging from 375° F. to 440° F. The sulfur content of the hydrotreated gasoline was determined using gas chromatography with a macrobore column and a parallel FID/sulfur chemiluminescence detector (Sievers Model 350 detector system). Thiophenic sulfur was determined by measuring the sulfur content of a gasoline sample which had been extracted with a saturated caustic-methanol solution to remove mercaptans. FIG. 1 shows the decline in octane (RON and MON) with thiophenic sulfur removal. For less than about 90% thiophene removal at the mild hydrotreating conditions of this test, octane was scarcely affected by hydrotreating. Above 95% thiophene removal, octane dropped significantly with thiophene conversion.

TABLE I

|  | Example 1 Coker Pentane/Hexane | Example 2 FCC Gasoline | Example 3 FCC Heavy Gasoline |
|---|---|---|---|
| Total Sulfur, ppm | 1133 | 510 | 660 |
| Thiophenic Sulfur, ppm | 610 | | |
| Nitrogen, ppm | | 251 | 178 |
| Olefin content, vol. % | 36.5 | | |
| Bromine Number, gms/100 gm | | 43 | 30.9 |
| Aromatics, % | | 34% | |
| Research Octane (RON) | 80.8 | 87.8 | 94.8 |
| Motor Octane (MON) | 71.5 | 78 | 83.3 |
| Simulated Distillation (D2887), ° F. | | | |
| St/5% | 86/94 | 105/139 | 71/198 |
| 10/30% | 102/124 | 155/207 | 254/321 |
| 50% | 152 | 267 | 350 |
| 70/90% | 177/213 | 316/363 | 393/443 |
| 95/EP | 221/254 | 379/397 | 464/515 |

Example 2

Figure 2:
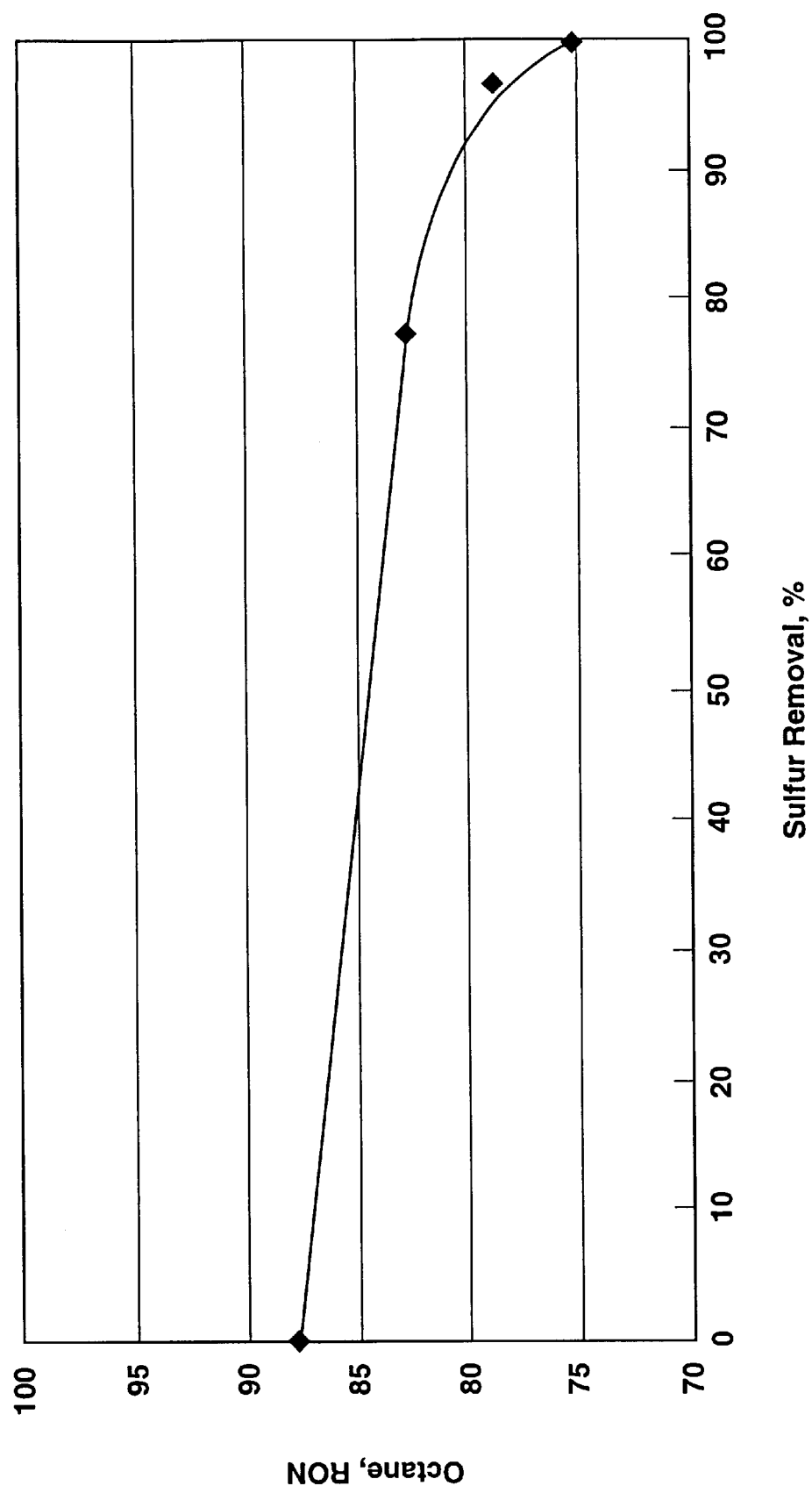

An FCC gasoline having the properties listed in Table I was hydrotreated over Criterion 424 catalyst, a commercial nickel/molybdenum/$Al_2O_3$ catalyst, at 1.2 $hr^{-1}$ feed rate, 4200 SCFB hydrogen rate at 365 psig $H_2$ pressure, and at temperatures ranging from 400° F. to 700° F. FIG. 2 shows that the gasoline research octane (RON) decreased significantly as hydrotreating severity was increased to greater than about 95% sulfur removal.

Example 3

Figure 3:
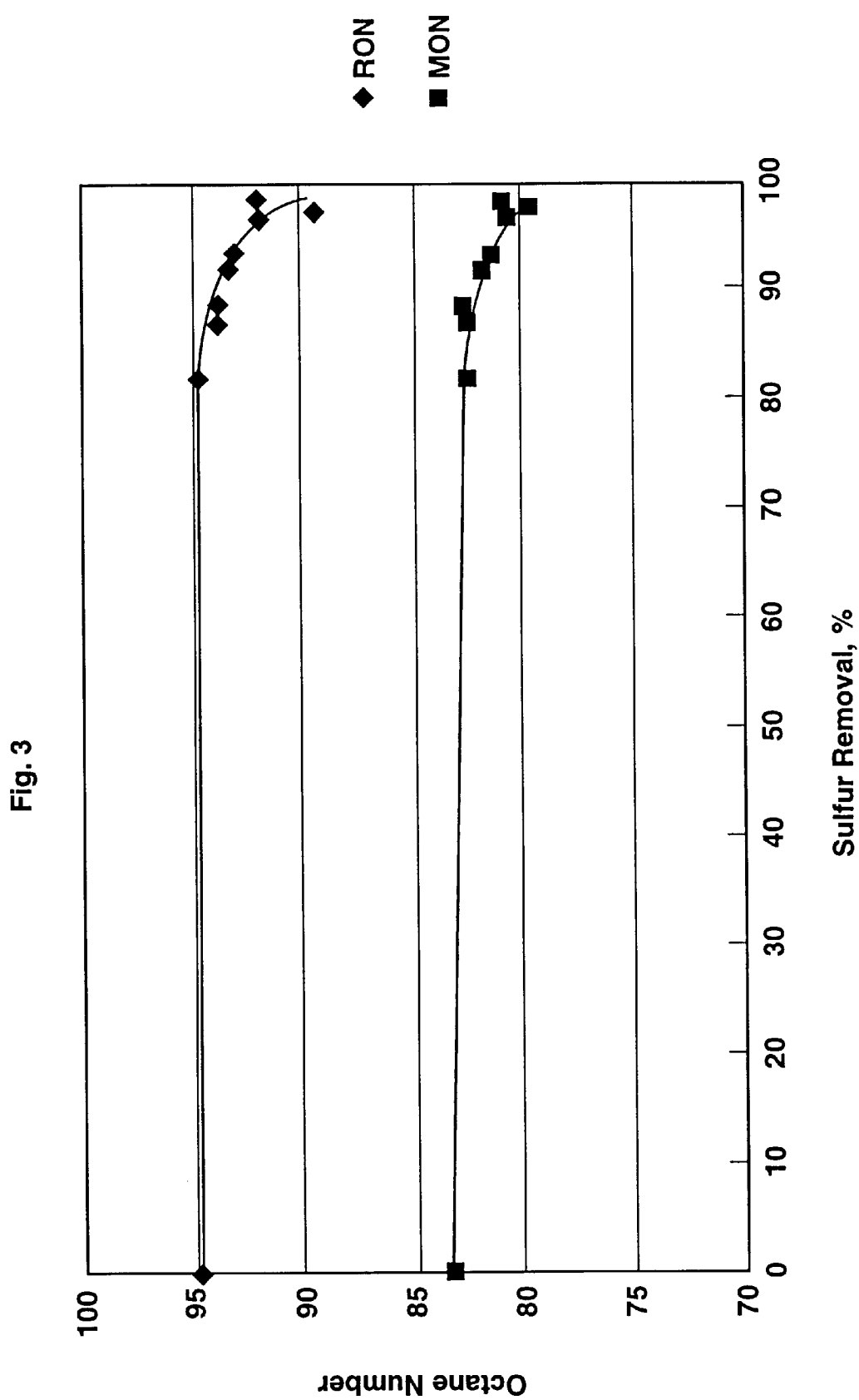

An FCC Heavy Gasoline having the properties listed in Table I was hydrotreated over Criterion 448 catalyst, a commercial cobalt/molybdenum/$Al_2O_3$ catalyst, at feed rates of 1.2 $hr^{-1}$ and 3.2 $hr^{-1}$, 4200 SCFB hydrogen rate at 100 psig $H_2$ pressure, and at temperatures ranging from 400° F. to 550° F. FIG. 3 shows the decline in octane (RON and MON) with sulfur removal. As in Example 2, with less than about 90% sulfur removal at the mild hydrotreating conditions of this test, octane was not significantly reduced during hydrotreating. Above 95% sulfur removal, octane dropped significantly.

Example 4

The coker pentane/hexane stream of Example 1 was hydrotreated over Criterion 448 catalyst at a feed rate of 1.2 $hr^{-1}$, 4200 SCFB hydrogen rate at 100 psig total inlet pressure and 410° F. The hydrogen supply to the reactor contained varying amounts of sulfur as $H_2S$, which was added to the hydrogen prior to hydrotreating. Table II (Run A) shows that the sulfur content of the hydrotreated product increased from 490 ppm to 3670 ppm as the $H_2S$ content in the hydrogen stream increased to 7100 ppm. Thus, hydrogen with high amounts of sulfur actually increased the sulfur level during hydrotreating, rather than decreasing it. In Run B the coker feed was hydrotreated in the presence of hydrogen containing 7100 ppm sulfur as $H_2S$. The temperature was increased to decrease product sulfur. As shown in Table II, the sulfur was reduced to 240 ppm, but at the expense of a 95% reduction in olefin content and a 10.2 number reduction in research octane.

TABLE II

| Run | Reaction Temperature, ° F. | $H_2S$ content in $H_2$ stream, ppm | Hydrotreated Gasoline Sulfur, ppm | Olefin content, vol. % | RON | MON |
| --- | --- | --- | --- | --- | --- | --- |
| A | 410 | 0.0 | 490 | 32.6 | 81.2 | 72.6 |
|   | 410 | 1180 | 1020 | 30.4 | 80.3 | 72.1 |
|   | 410 | 1660 | 1680 | 30.3 | 80.7 | 71.9 |
|   | 410 | 7100 | 3670 | 33.5 | 81.9 | 72.7 |
| B | 440 | 7100 | 3070 | 27.7 | 79.3 | 72.0 |
|   | 455 | 7100 | 2480 | 23.0 | 77.4 | 71.1 |
|   | 470 | 7100 | 1740 | 16.0 | 74.6 | 69.9 |
|   | 510 | 7100 | 240 | 2.0 | 69.1 | 68.2 |

Example 5

Figure 4:
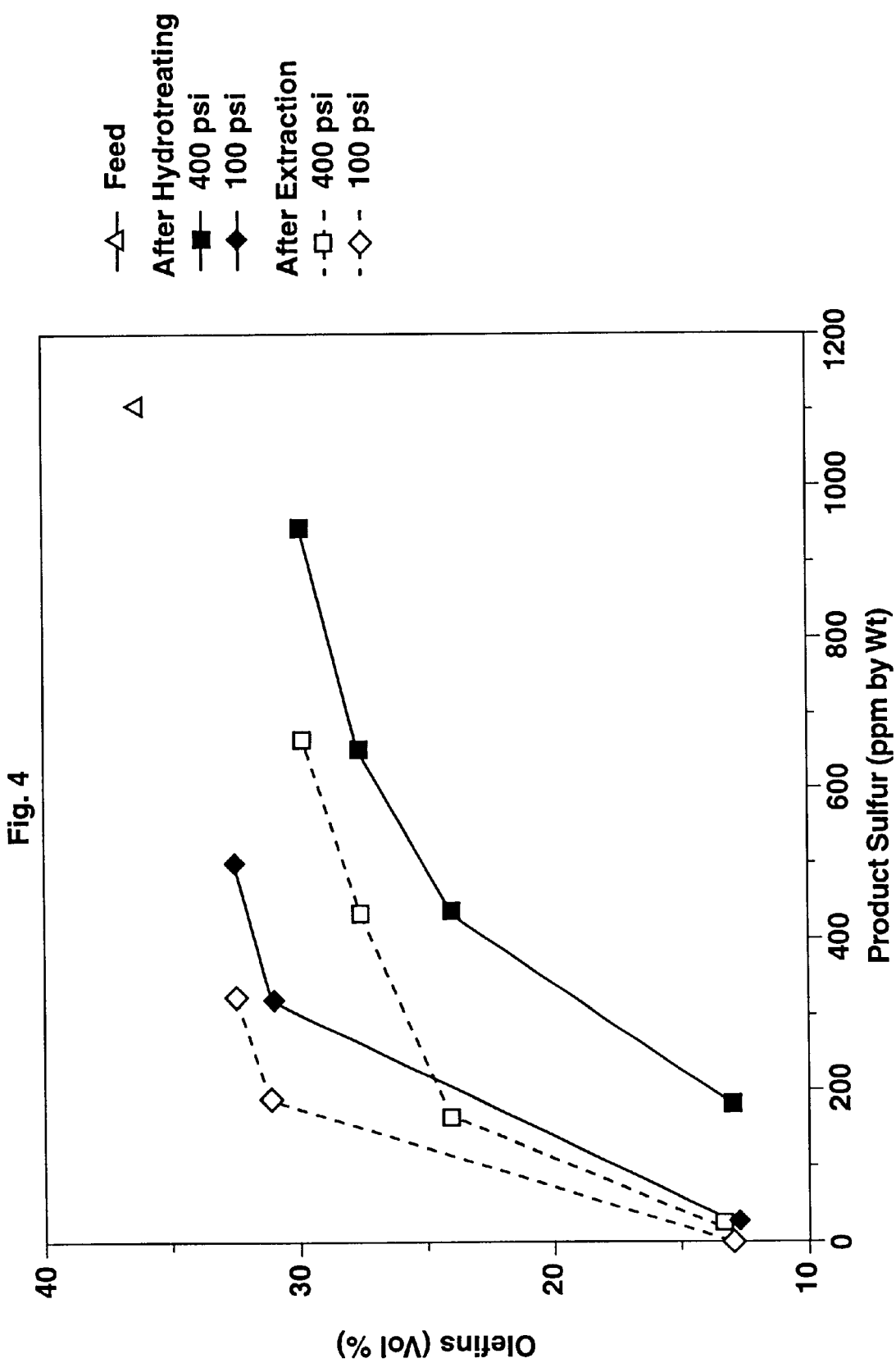
FIGS. 4–5 compare hydrotreating and hydrotreating plus extraction for removing sulfur compounds from a gasoline stream.
Figure 5:
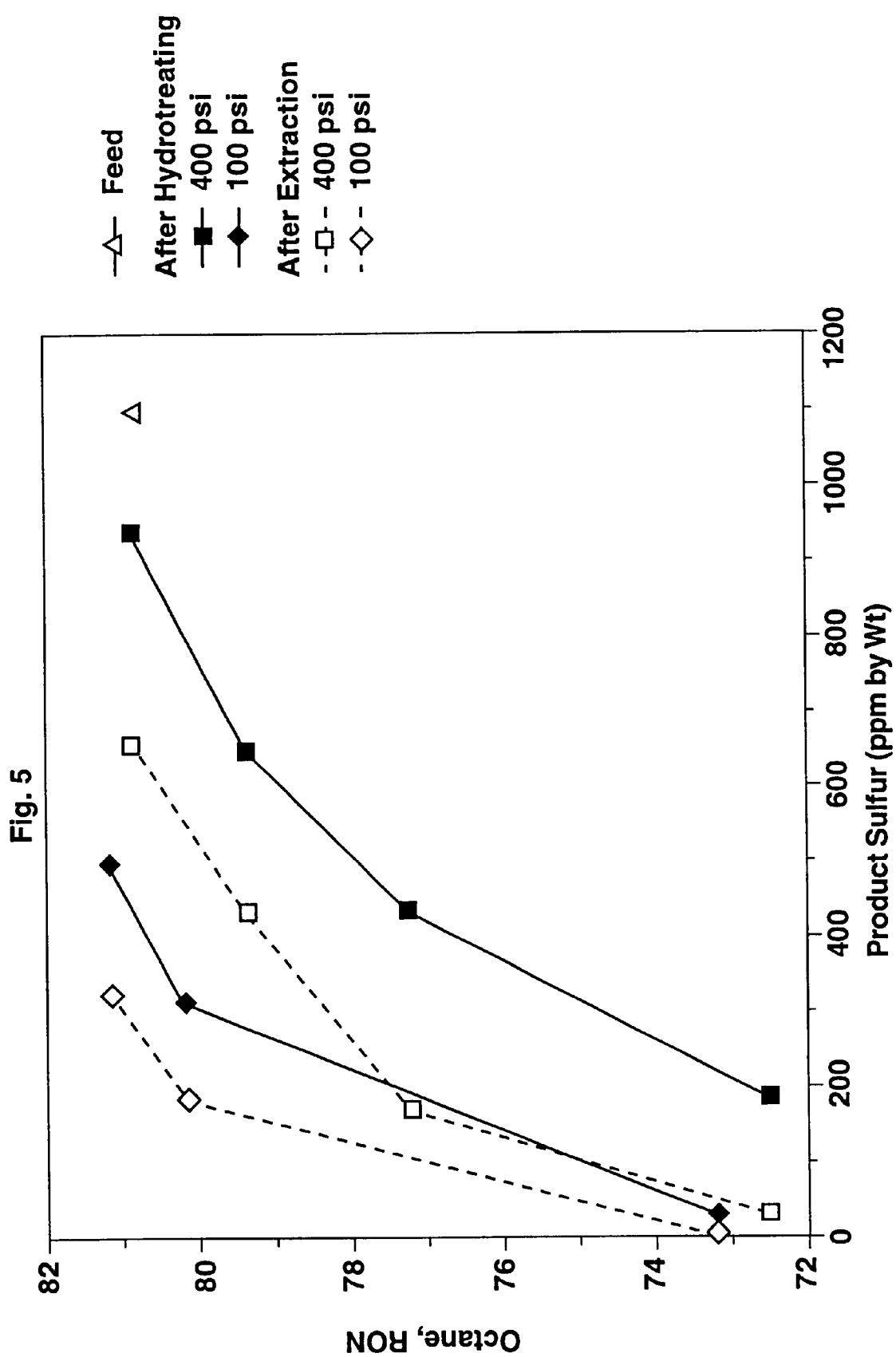

A coker pentane/hexane stream having the properties listed in Table I was hydrotreated over Criterion 448 catalyst, a commercial cobalt/molybdenum/$Al_2O_3$ catalyst, at a rate of 1.2 $hr^{-1}$, 4200 SCFB hydrogen rate at 100 psig hydrogen pressure, and at temperatures ranging from 375° F. to 440° F. The sulfur content of the hydrotreated gasoline was determined using gas chromatography with a macrobore column and a parallel FID/sulfur chemiluminescence detector (Sievers Model 350 detector system). The partially desulfurized coker pentane/hexane stream was then extracted with a saturated caustic-methanol solution, and the sulfur content again determined. Data showing the effect of sulfur removal on olefin content (FIG. 4) and on octane (FIG. 5) at 100 psig hydrotreating pressure is illustrated in FIGS. 4 and 5. This test was then repeated, using hydrotreating at 400 psig.

This data shows that the decrease in olefin content and in octane occurred at significantly higher amounts of sulfur removal when both hydrotreating and extraction were used, compared to using hydrotreating alone.

What is claimed is:

1. A process for desulfurizing gasoline containing olefins comprising:

(a) contacting a gasoline stream containing sulfur and olefins with hydrogen in the presence of a hydrotreating catalyst at a temperature of between 300° F. and 500° F., a total pressure between 50 psig and 500 psig and a feed rate between 0.5 $hr^{-1}$ and 10 $hr^{-1}$ for a time sufficient to convert up to 95% of the thiophene present in the stream, to produce a hydrotreated gasoline stream;

(b) contacting the hydrotreated gasoline stream with solid adsobent or a liquid extractant selected to remove some or all of the sulfur compounds remaining in the hydrotreated gasoline stream; and (c) recovering a gasoline stream containing unconverted olefins and having reduced sulfur content.

2. The process according to claim 1 covert from 70% to 90% of the thiophenes present in the gasoline stream.

3. The process according to claim 1 wherein hydrotreating conditions include a reaction temperature between 350° F. and 475° F. and a total pressure between 100 psig and 400 psig.

4. The process according to claim 3 wherein the hydrotreating conditions include a feed rate between about 1.0 $hr^{-1}$ and 4.0 $hr^{-1}$ LHSV.

5. The process according to claim 1 wherein the hydrogen for contacting the sulfur-containing gasoline stream contains less than 1000 ppm sulfur as $H_2S$.

6. The process according to claim 1 wherein the sulfur-containing gasoline contains greater than 40 ppm thiophenes.

7. The process according to claim 1 to produce a gasoline stream which contains less than about 150 ppm sulfur.

8. The process according to claim 7 to produce a gasoline stream which contains less than about 75 ppm sulfur.

9. The process according to claim 8 to produce a gasoline stream which contains less than about 50 ppm sulfur.

10. The process according to claim 9 wherein the gasoline stream contains less than 10 ppm total sulfur as mercaptans.

11. The process according to claim 1 wherein the hydrotreating catalyst comprises one or more components of nickel and cobalt and one or more components of molybdenum and tungsten and/or one or more components of platinum and/or palladium.

12. The process according to claim 11, wherein the hydrotreating catalyst comprises nickel and molybdenum on an alumina support.

13. The process according to claim 1 wherein the solid adsorbent comprises at least one material selected from the group consisting of alumina, a zeolitic material, a clay material, activated carbon, copper, and metal oxides.

* * * * *